P. W. GUM & W. H. SEAWELL.
RECIPROCATING CHURN.
No. 185,744.  Patented Dec. 26, 1876.
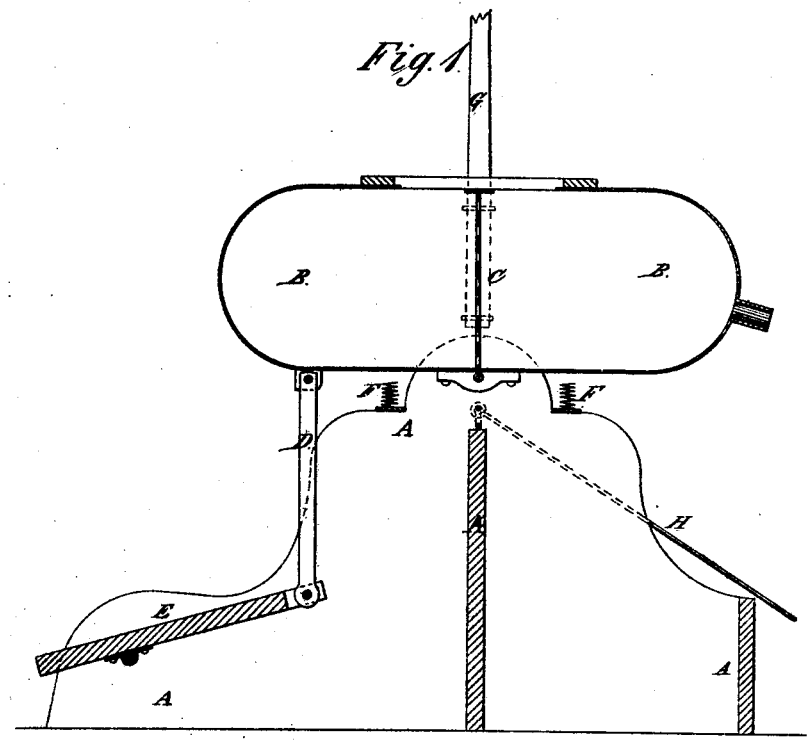
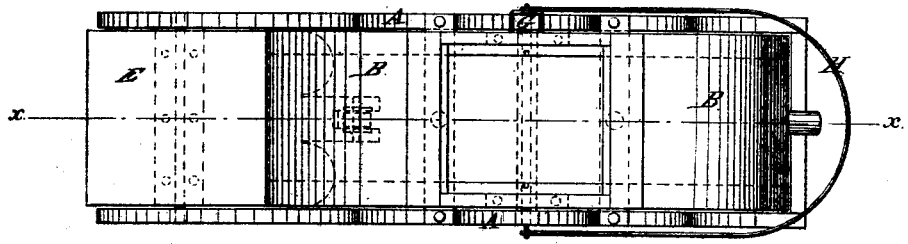

UNITED STATES PATENT OFFICE.

PEYTON W. GUM, AND WILLIAM H. SEAWELL, OF STRASBURG, MISSOURI.

IMPROVEMENT IN RECIPROCATING CHURNS.

Specification forming part of Letters Patent No. 185,744, dated December 26, 1876; application filed July 1, 1876.

*To all whom it may concern:*

Be it known that we, PEYTON WELCH GUM and WILLIAM HENRY SEAWELL, of Strasburg, in the county of Cass, and State of Missouri, have invented a new and useful Improvement in Churns, of which the following is a specification:

Figure 1 is a vertical longitudinal section of our improved churn, taken through the line $x\ x$, Fig. 2. Fig. 2 is a top view of the same.

Similar letters of reference indicate corresponding parts.

The object of this invention is to furnish an improved churn, which shall be simple in construction, convenient in use, and effective in operation, being easily operated, and bringing the butter very quickly.

The invention consists in the long shallow churn-body, provided with a detachable perforated board in its center, pivoted to the frame, and connected at one end by a rod with a treadle.

A represents a frame-work, to the upper part of which is pivoted the churn-body B, which is made long and comparatively shallow, and with semi-cylindrical ends. The churn body B is provided with a short discharge-spout at one end, for convenience in pouring out the buttermilk. C is a perforated board or plate, the side edges of which are inserted in grooves in the sides of the churn-body B, so that it may be conveniently removed when desired. To the bottom of the churn-body B, near one end, is pivoted the upper end of a connecting-rod, D, the other end of which is pivoted to the treadle E. The treadle E is pivoted to the end part of the frame A.

By this construction, by operating the treadle E, the churn-body B will be rocked upon its pivots, forcing the milk from one end of the said churn-body to the other through the holes in the plate C, and bringing the butter in a very short time. The ends of the churn-body B, in their downward movement, are received upon springs F, attached to cross-bars of the frame A, to diminish the jar, and assist in starting the said churn-body in its return movement.

Access is had to the interior of the churn-body B through an opening in its top, which opening is closed by a closely-fitting cover. To one side of the middle part of the churn-body B is attached a lever, G, to enable the churn to be operated by hand, and which is specially designed for the use of children who are not heavy enough to work the treadle E.

The frame A may be provided with a bail, H, or handles, for convenience in moving the churn from place to place.

Having thus described our invention, we claim as new and desire to secure by Letters Patent—

The long and shallow churn-body B, provided with a detachable perforated board, C, in its center, pivoted to the frame A, and connected at one end by the rod D with a treadle E, substantially as herein shown and described.

PEYTON W. GUM.
W. H. SEAWELL.

Witnesses:
A. S. GUM,
I. C. LETTRELL.